(12) United States Patent
Diessner et al.

(10) Patent No.: US 12,626,933 B2
(45) Date of Patent: May 12, 2026

(54) BIPOLAR PLATE FOR AN ELECTROCHEMICAL CELL, METHOD FOR MANUFACTURING SAID BIPOLAR PLATE, ARRANGEMENT OF ELECTROCHEMICAL CELLS, AND METHOD FOR OPERATING SAID ARRANGEMENT OF ELECTROCHEMICAL CELLS

(71) Applicant: Robert Bosch GmbH, Stuttgart (DE)

(72) Inventors: Christian Diessner, Muehlacker-Muehlhausen (DE); Harald Schmeisser, Stuttgart (DE); Jochen Wessner, Esslingen (DE); Stefan Schoenbauer, Ditzingen (DE); Ulrich Berner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 614 days.

(21) Appl. No.: 18/254,482

(22) PCT Filed: Oct. 25, 2021

(86) PCT No.: PCT/EP2021/079485
§ 371 (c)(1),
(2) Date: Jun. 19, 2023

(87) PCT Pub. No.: WO2022/111926
PCT Pub. Date: Jun. 2, 2022

(65) Prior Publication Data
US 2024/0047706 A1 Feb. 8, 2024

(30) Foreign Application Priority Data
Nov. 30, 2020 (DE) ..................... 10 2020 215 013.3

(51) Int. Cl.
*H01M 8/0258* (2016.01)
*C25B 9/19* (2021.01)
(Continued)

(52) U.S. Cl.
CPC ............. *H01M 8/0258* (2013.01); *C25B 9/19* (2021.01); *C25B 9/70* (2021.01); *C25B 13/02* (2013.01);
(Continued)

(58) Field of Classification Search
CPC ............. H01M 8/0258; H01M 8/1004; H01M 8/1007; H01M 8/241; H01M 8/2457;
(Continued)

(56) References Cited

U.S. PATENT DOCUMENTS

| | | | | |
|---|---|---|---|---|
| 4,604,331 A | * | 8/1986 | Louis | ................... H01M 8/0271 |
| | | | | 429/511 |
| 5,362,578 A | * | 11/1994 | Petri | ................... H01M 8/0247 |
| | | | | 429/513 |

(Continued)

FOREIGN PATENT DOCUMENTS

| | | | | | |
|---|---|---|---|---|---|
| CN | 1691369 A | * | 11/2005 | .......... | H01M 8/0247 |
| CN | 102082282 A | * | 6/2011 | ............ | H01M 8/026 |

(Continued)

OTHER PUBLICATIONS

Translation of International Search Report for Application No. PCT/EP2021/079485 dated Feb. 14, 2022 (2 pages).

*Primary Examiner* — Kaity V Chandler
(74) *Attorney, Agent, or Firm* — Michael Best & Friedrich LLP

(57) ABSTRACT

The invention relates to a bipolar plate (7) for an electrochemical cell (1), said bipolar plate comprising at least one first monopolar plate (13) having a first bead (15) and a second monopolar plate (17) having a second bead (19), the first bead (15) and the second bead (19) being arranged opposite one another and forming a channel (21), the first bead (15) and the second bead (19) each comprising a central base surface (23) and at least two inclined surfaces (Continued)

(24), and the first bead (15) and/or the second bead (19) comprising at least one outer base surface (25). At least one opening element (111) for the passage of at least one medium (29) between one of the at least two inclined surfaces (24) and the at least one outer base surface (25) is located on the first bead (15) and/or the second bead (19), said at least one opening element (111) comprising a lateral surface (121), a first open side surface (113), a second open side surface (115), and a top surface (140) having an opening (27), said first open side surface (113) being located in the at least one outer base surface (25), and said second open side surface (115) being located in one of the at least two inclined surfaces (24). The invention also relates to a method for manufacturing the bipolar plate (7), to an arrangement (69) of electrochemical cells (1), and to a method for operating said arrangement (69) of electrochemical cells (1).

15 Claims, 3 Drawing Sheets

(51) Int. Cl.

| | |
|---|---|
| *C25B 9/70* | (2021.01) |
| *C25B 13/02* | (2006.01) |
| *H01M 8/1004* | (2016.01) |
| *H01M 8/1007* | (2016.01) |
| *H01M 8/241* | (2016.01) |
| *H01M 8/2457* | (2016.01) |

(52) U.S. Cl.
CPC ....... *H01M 8/1004* (2013.01); *H01M 8/1007* (2016.02); *H01M 8/241* (2013.01); *H01M 8/2457* (2016.02)

(58) Field of Classification Search
CPC .. H01M 8/021; H01M 8/0256; H01M 8/0206; H01M 8/0254; C25B 9/19; C25B 9/70; C25B 13/02; C25B 1/04; C25B 9/60; C25B 9/77; C25B 15/08; C25B 9/75; Y02E 60/50; Y02P 70/50
See application file for complete search history.

(56) References Cited

U.S. PATENT DOCUMENTS

| | | | | | |
|---|---|---|---|---|---|
| 6,858,341 | B2 * | 2/2005 | Edlund | .............. | H01M 8/0267 |
| | | | | | 429/468 |
| 2002/0114990 | A1 * | 8/2002 | Fly | ..................... | H01M 8/2418 |
| | | | | | 429/514 |
| 2003/0022052 | A1 * | 1/2003 | Kearl | .................. | H01M 8/0228 |
| | | | | | 216/17 |
| 2003/0031915 | A1 * | 2/2003 | Diez | ................... | H01M 8/2432 |
| | | | | | 429/456 |
| 2003/0108782 | A1 * | 6/2003 | Leger | ................. | H01M 8/0265 |
| | | | | | 429/460 |
| 2003/0124405 | A1 * | 7/2003 | Rock | ..................... | H01M 8/241 |
| | | | | | 429/514 |
| 2003/0134175 | A1 * | 7/2003 | Karichev | ........... | H01M 8/2459 |
| | | | | | 429/456 |
| 2003/0154886 | A1 * | 8/2003 | Anhorn | ...................... | C09J 5/06 |
| | | | | | 156/325 |
| 2003/0165729 | A1 * | 9/2003 | Ringel | ............... | H01M 8/2432 |
| | | | | | 429/416 |
| 2003/0170509 | A1 * | 9/2003 | Datz | ................... | H01M 8/0234 |
| | | | | | 429/442 |
| 2004/0209150 | A1 * | 10/2004 | Rock | ................... | H01M 8/0267 |
| | | | | | 429/514 |
| 2006/0046130 | A1 * | 3/2006 | Lai | ...................... | H01M 8/2483 |
| | | | | | 429/457 |
| 2008/0166622 | A1 * | 7/2008 | Shizuku | .............. | H01M 8/0254 |
| | | | | | 429/444 |
| 2011/0123887 | A1 * | 5/2011 | Suda | ................... | H01M 8/2457 |
| | | | | | 429/435 |
| 2014/0057193 | A1 * | 2/2014 | Wilkosz | .............. | H01M 8/0254 |
| | | | | | 429/457 |
| 2014/0141352 | A1 * | 5/2014 | Suzuki | ............... | H01M 8/2457 |
| | | | | | 429/465 |
| 2015/0044592 | A1 * | 2/2015 | Terada | ............... | H01M 8/1004 |
| | | | | | 429/465 |
| 2018/0175406 | A1 * | 6/2018 | Kong | .................. | H01M 8/2483 |
| 2018/0375143 | A1 * | 12/2018 | Wang | ................. | H01M 8/2432 |
| 2019/0074525 | A1 * | 3/2019 | Tomana | ............. | H01M 8/0276 |
| 2019/0207229 | A1 * | 7/2019 | Berner | ..................... | B60K 6/32 |
| 2020/0127303 | A1 * | 4/2020 | Nobata | .............. | H01M 8/1004 |

FOREIGN PATENT DOCUMENTS

| | | | | | |
|---|---|---|---|---|---|
| CN | 110877154 | A | * | 3/2020 | ......... H01M 8/0267 |
| CN | 211743308 | U | * | 10/2020 | ............ Y02E 60/50 |
| CN | 212136599 | U | * | 12/2020 | ............ Y02E 60/50 |
| CN | 212257566 | U | * | 12/2020 | ............ Y02E 60/50 |
| CN | 113270607 | A | * | 8/2021 | ......... H01M 8/0258 |
| DE | 10158772 | C1 | | 6/2003 | |
| DE | 10248531 | B4 | | 4/2004 | |
| DE | 102005057045 | A1 | | 6/2007 | |
| EP | 3350863 | B1 | | 11/2019 | |
| JP | 4959190 | B2 | | 6/2012 | |
| JP | 2014175115 | A | * | 9/2014 | ............ Y02E 60/50 |
| JP | 2017041402 | A | * | 2/2017 | ............ Y02E 60/50 |
| JP | 2019046817 | A | * | 3/2019 | ............ Y02E 60/50 |
| JP | 2020074318 | A | * | 5/2020 | ............ Y02E 60/50 |

* cited by examiner

BIPOLAR PLATE FOR AN ELECTROCHEMICAL CELL, METHOD FOR MANUFACTURING SAID BIPOLAR PLATE, ARRANGEMENT OF ELECTROCHEMICAL CELLS, AND METHOD FOR OPERATING SAID ARRANGEMENT OF ELECTROCHEMICAL CELLS

BACKGROUND

The invention relates to a bipolar plate for an electrochemical cell comprising at least one first monopolar plate having a first bead and a second monopolar plate having a second bead, the first bead and the second bead being arranged opposite one another and forming a channel, and the first bead and the second bead in each case comprising a central base surface and at least two inclined surfaces. The invention also relates to a method for manufacturing the bipolar plate, to an arrangement of electrochemical cells, and to a method for operating said arrangement of electrochemical cells.

Electrochemical cells are electrochemical energy converters and are known in the form of fuel cells or electrolyzers.

A fuel cell converts chemical reaction energy into electrical energy. In known fuel cells, hydrogen ($H_2$) and oxygen ($O_2$) are in particular converted to water ($H_2O$), electrical energy, and heat.

Proton-exchange membrane (PEM) fuel cells are known, among others. Proton-exchange membrane fuel cells comprise a centrally arranged membrane that is permeable to protons, i.e., hydrogen ions. The oxidizing agent, in particular atmospheric oxygen, is thereby spatially separated from the fuel, in particular hydrogen.

Fuel cells comprise an anode and a cathode. The fuel is continuously supplied to the fuel cell at the anode and catalytically oxidized with loss of electrons to form protons that reach the cathode. The lost electrons are discharged from the fuel cell and flow via an external circuit to the cathode. The oxidizing agent is supplied to the fuel cell at the cathode and reacts to form water by receiving the electrons from the external circuit and protons. The resulting water is drained from the fuel cell. The gross reaction is:

$$O_2 + 4H^+ + 4e^- \rightarrow 2H_2O$$

A voltage is in this case applied between the anode and the cathode of the fuel cell. In order to increase the voltage, multiple fuel cells can be mechanically arranged one behind the other to form a fuel cell stack, which can also be referred to as a fuel cell setup, and can be electrically connected in series.

A stack of electrochemical cells, which can be referred to as an arrangement of electrochemical cells, typically comprises end plates that press the individual cells together and impart stability to the stack.

The electrodes, i.e., the anode and the cathode, and the membrane can be structurally assembled to form a membrane-electrode assembly (MEA).

Stacks of electrochemical cells further comprise bipolar plates, also referred to as gas distributor plates or distributor plates. Bipolar plates are used to distribute the fuel evenly to the anode and to distribute the oxidizing agent evenly to the cathode. In addition to the media guidance with respect to oxygen, hydrogen, water, and optionally a coolant, the bipolar plates ensure a planar electrical contact to the membrane.

A fuel cell stack typically comprises up to several hundred individual fuel cells stacked one on top of the other in layers.

The individual fuel cells comprise one MEA as well as one respective bipolar plate half on the anode side and on the cathode side. In particular, a fuel cell comprises an anode monopolar plate and a cathode monopolar plate, typically each in the form of embossed sheets, which together form the bipolar plate and thus form channels for guiding gas and liquids, between which the cooling medium can flow.

Electrochemical cells typically further comprise gas diffusion layers arranged between a bipolar plate and an MEA.

In contrast to a fuel cell, an electrolyzer is an energy converter which, while applying electrical voltage, preferably splits water into hydrogen and oxygen. Electrolyzers also comprise MEAS, bipolar plates, and gas diffusion layers, among other things.

Electrochemical cells in a stack are often supplied with the media, in particular hydrogen and oxygen, or these media are discharged via media channels arranged perpendicular to the membrane of the electrochemical cell. The media channels are fluidically connected to the electrochemical cells, in particular to the bipolar plates, by ports, which can also be referred to as fluid terminals. The media channels are typically located on the edge of the stack and are often generated by congruently overlapping recesses forming the ports. From the ports, the media are fed through port passages into what is referred to as the flow-field, the active surface of the bipolar plate or membrane.

In particular, the port passages for air or hydrogen facing the MEA are designed so that the port passages provide as large an opening as possible for the inflowing and outflowing media and, on the other hand, provide the best possible mechanical support effect for seals arranged on the opposite side of the MEA.

DE 10158772 C1 and DE 10248531 B4 relate to fuel cell stacks with a layering of multiple fuel cells, whereby media are fed or discharged by bipolar plates and bead arrangements are provided for the sealing.

SUMMARY

A bipolar plate for an electrochemical cell is proposed, said bipolar plate comprising at least one first monopolar plate having a first bead and a second monopolar plate having a second bead, the first bead and the second bead being arranged opposite one another and forming a channel, the first bead and the second bead each comprising a central base surface and at least two inclined surfaces, and the first bead and/or the second bead comprising at least one outer base surface, whereby at least one opening element for the passage of at least one medium between one of the at least two inclined surfaces and the at least one outer base surface is located on the first bead and/or the second bead, said at least one opening element comprising a lateral surface, a first open side surface, a second open side surface, and a top surface having an opening, said first open side surface being located in the at least one outer base surface, and said second open side surface being located in one of the at least two inclined surfaces.

Further proposed is an arrangement of electrochemical cells comprising at least the bipolar plate and at least one membrane-electrode assembly, the at least one opening element being arranged on the at least one bipolar plate such that the opening faces the at least one membrane-electrode assembly. The invention further relates to a method for manufacturing the bipolar plate, the first bead and/or the second bead and the at least one opening element being produced by embossing from a base plate of the first monopolar plate and the second monopolar plate, respectively, and a method for operating the arrangement whereby the at least one medium is passed from the channel through the at least one opening element to the at least one membrane-electrode assembly, the at least one medium entering the at least one opening element through the second open side surface and/or through the first open side surface and exiting the at least one opening element through the opening.

The electrochemical cell, which is preferably a fuel cell or an electrolyzer, preferably comprises at least one bipolar plate according to the invention, at least one gas diffusion layer, and at least one membrane or membrane-electrode assembly. In particular, a membrane-electrode assembly is respectively arranged between two bipolar plates. Preferably, the arrangement of electrochemical cells, which is preferably a fuel cell stack, comprises at least one membrane-electrode assembly, at least one bipolar plate according to the present invention, further preferably at least two bipolar plates according to the present invention, and at least one port. The at least one port can be an inlet or an outlet.

The bipolar plate preferably comprises a carbon such as graphite, a metal such as stainless steel or titanium, and/or an alloy containing the metal. Further preferably, the bipolar plate is constructed of carbon, metal, and/or the alloy.

Preferably, the at least one medium comprises hydrogen, air or oxygen, water, and/or a cooling medium, and further preferably the at least one medium comprises the cooling medium, hydrogen, or a mixture containing oxygen and/or water.

The at least one opening element is used to pass the at least one medium through the first monopolar plate or the second monopolar plate. Preferably, solely the at least one opening element is used to pass the at least one medium through the first monopolar plate or the second monopolar plate. The opening element can also be referred to as a shaping or embossment.

The first bead and/or the second bead can in particular also be referred to as a metallic sealing bead. The first bead and the second bead preferably form a seal element. The sealing element, which preferably seals the at least one port outwardly and against further media, is overcome by the at least one medium, in particular through the at least one opening, in order to optionally first enter a distributor structure and then onto an active surface of the bipolar plate.

Preferably, the first bead and/or the second bead are arranged on the at least one port. Further preferably, the first bead and/or the second bead surround the at least one port, more preferably completely. The first bead and the second bead can surround exclusively the at least one port, and further preferably only exactly one port. Furthermore, the first bead and the second bead can preferably completely surround the active surface of the bipolar plate and/or the MEA, which is arranged in particular adjacently, so that the first bead and the second bead act together as a sealing element of the at least one port and/or the active surface.

The opening can also be referred to as a through-opening, breakthrough, or aperture. Preferably, the first bead and/or the second bead comprise a plurality of opening elements and a corresponding number of openings. The opening has a preferably round cross-sectional surface area.

The opening is preferably produced by bores, in particular of the base plate of the first monopolar plate and the second monopolar plate, respectively. Alternatively, the at least one opening element can first be produced, and the opening can then be punched out. Furthermore, machining is possible. In addition, in a further embossing step, the edge contour of the at least one opening element can be optimized.

Preferably, the central base surface and the at least one outer base surface constitute horizontal regions arranged substantially parallel to the base plate of the first monopolar plate or the second monopolar plate. Further preferably, the central base surface and the at least one outer base surface of the first bead and/or the second bead are each arranged substantially parallel to one another. The term "substantially parallel" is understood to mean that the base surfaces, i.e., the central base surface and/or the at least one outer base surface form an angle of less than 20°, preferably less than 10°, in relation to one another or to the base plate.

The central base surface of the first monopolar plate or the second monopolar plate is preferably arranged between two inclined surfaces. The at least two inclined surfaces can also be referred to as legs or flanks. Furthermore, the at least two inclined surfaces are inclined, in particular opposite the central base surface and the at least one outer base surface. Preferably, an inclination angle lies within a range of 100° to 170°, further preferably 110° to 160°.

The central base surface and the at least one outer base surface are preferably planar surfaces. The at least two inclined surfaces can be contoured, i.e., having at least one curve. Preferably, the at least two inclined surfaces, which are respectively arranged adjacent to the central base surface, preferably have an angle of inclination with an opposite sign.

The first bead and/or the second bead can comprise at least two opening elements, which can be arranged on opposite sides of the central base surface. The at least two opening elements can be arranged opposite one another or offset from one another.

The central base surface preferably has a first height in relation to the base plate of the first monopolar plate and or second monopolar plate, which constitutes a base level.

In a first preferred embodiment, the at least one outer base surface, in particular the at least one opening element, is arranged on no more than one inclined surface. The at least one outer base surface is correspondingly preferably arranged at a second height, which is further preferably less than 10% of the first height. In particular, the at least one outer base surface is arranged at the base level. The opening is arranged in the top surface, and the top surface, in particular the opening of the at least one opening element, is preferably arranged at an exit height, which is more than 20%, in particular more than 50%, of the first height.

In a second preferred embodiment, the first bead and/or the second bead respectively comprise at least three inclined surfaces, in particular three or four inclined surfaces, the at least one outer base surface being arranged in particular directly between two of the at least three inclined surfaces and forming a step, in particular between the two inclined surfaces. The step preferably has a third height, the third height being less than the first height and further preferably the third height being 20% to 80%, more preferably 30% to 70%, particularly preferably 40% to 60%, of the first height. The two inclined surfaces, which are arranged in particular on the same side of the central base surface or abut the same step, have the same inclination angle. In the second preferred embodiment, the at least one opening element is arranged on the step.

Preferably, the central base surface of the first bead and/or the second bead comprises a respective seal. Further preferably, the central base surface of the first bead and the central base surface of the second bead both comprise a respective seal. The seal is preferably designed as a coating. Further preferably, the seal comprises a polymer, such as an elastomer, and further preferably the seal comprises a material selected from the group consisting of silicone, rubber, in particular fluoro-rubber (FKM), polytetrafluorethylene (PTFE), and mixtures thereof.

The at least one opening element can be designed as a cowl and/or can be described as a half-pot. Furthermore, the at least one opening element can at least partially have a tapered shape or the shape of a polyhedron, which is preferably bordered by diamonds and/or rectangles. In particular, the at least one opening element is in the form of a rhomobohedron.

Preferably, the top surface is arranged substantially parallel to the at least one outer base surface and in particular to the base plate of the first monopolar plate or the second monopolar plate. The top surface preferably has a rectangular shape or is at least partially circular or round in shape. For example, the top surface partially has the shape of a semicircle.

Preferably, the lateral surface is bordered by the top surface, the at least one outer base surface, and one of the at least two inclined surfaces.

The opening preferably has a round cross-section. Alternatively, the opening can form a third open side surface of the opening element, so the opening element can also be referred to as a cowl. In this case, the top surface is preferably completely open.

The at least one opening element fluidically connects the port of the bipolar plate to the active surface, the port area being stiffened and supported by the opening element simultaneously in order to prevent undesirable deformation of the port area and to form a pressing surface for sealing.

Furthermore, the flow guidance can be optimized by the design of the at least one opening element, for example, by means of a targeted design of the lateral surface.

In particular, the circular opening has only small manufacturing tolerances.

BRIEF DESCRIPTION OF THE DRAWINGS

Embodiments of the invention are explained in greater detail with reference to the drawings and the following description.

Shown are.

DETAILED DESCRIPTION

In the following description of the embodiments of the invention, identical or similar elements are denoted by identical reference signs, whereby repeated description of these elements is omitted in individual cases. The drawings illustrate the subject matter of the invention merely schematically.

Figure 1:
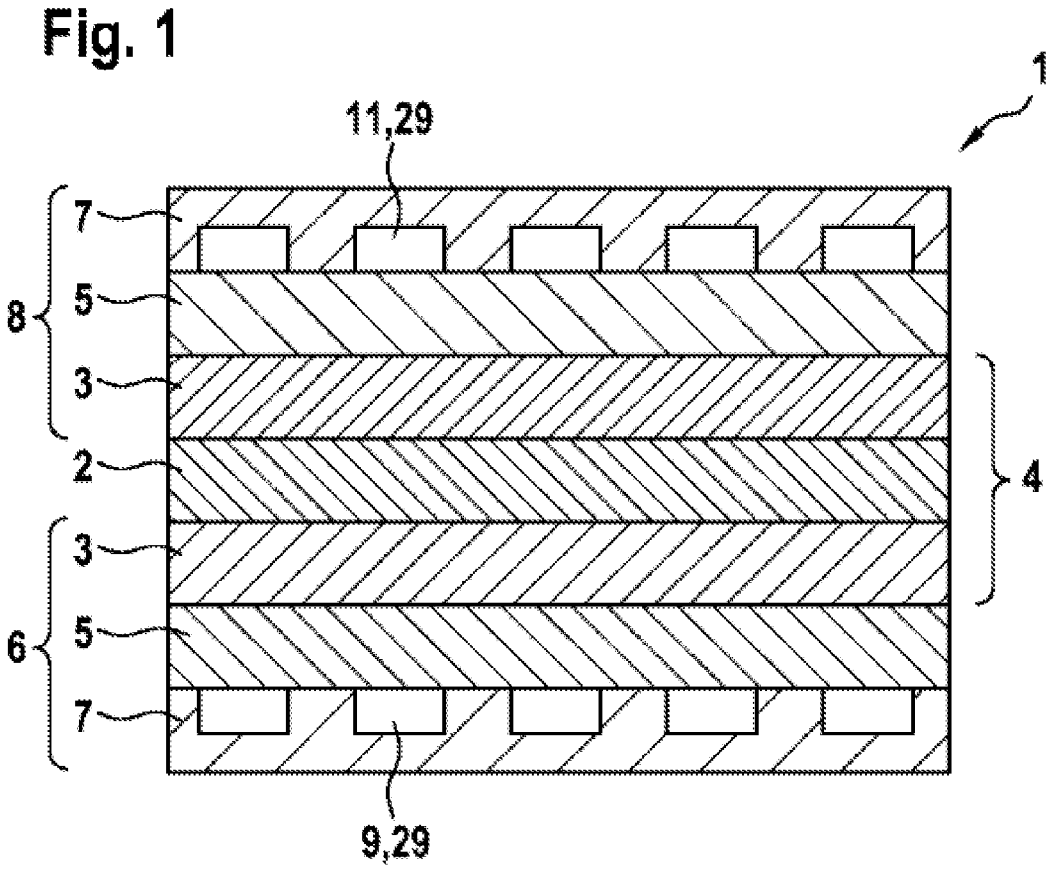
FIG. 1 a schematic view of an electrochemical cell.

FIG. 1 schematically shows an electrochemical cell 1 in the form of a fuel cell. The electrochemical cell 1 has a membrane 2 in the form of electrolytes. The membrane 2 separates a cathode space 6 from an anode space 8.

A respective electrode layer 3, a gas diffusion layer 5, and a distributor plate 7 are arranged on the membrane 2 in the cathode space 6 and anode space 8. The connection of the membrane 2 and the electrode layer 3 can also be referred to as a membrane-electrode assembly 4.

Media 29 are supplied in the bipolar plates 7. Through the bipolar plate 7 in the cathode space 6, oxygen 9 reaches the gas diffusion layer 5, and through the bipolar plate 7 of the anode space 8, hydrogen 11 reaches the corresponding gas diffusion layer 5.

Figure 2:
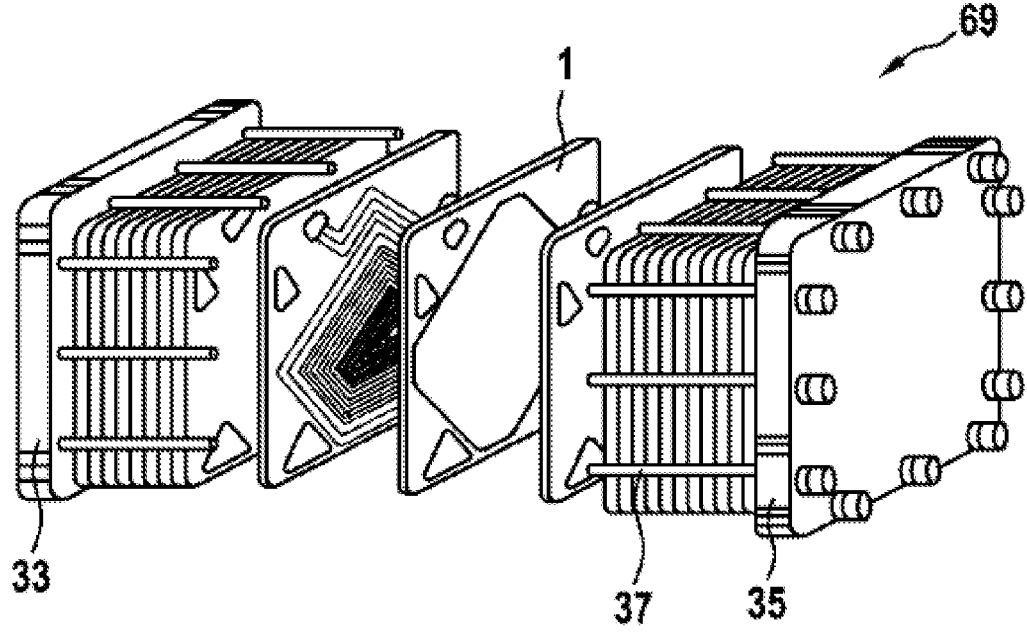
FIG. 2 an exploded view of an arrangement of electrochemical cells.

FIG. 2 shows an exploded view of an arrangement 69 of electrochemical cells 1 constituting a fuel cell stack. The arrangement 69 comprises individual electrochemical cells 1 strained between current collectors 33 and end plates 35 with straining elements 37.

Figure 3:
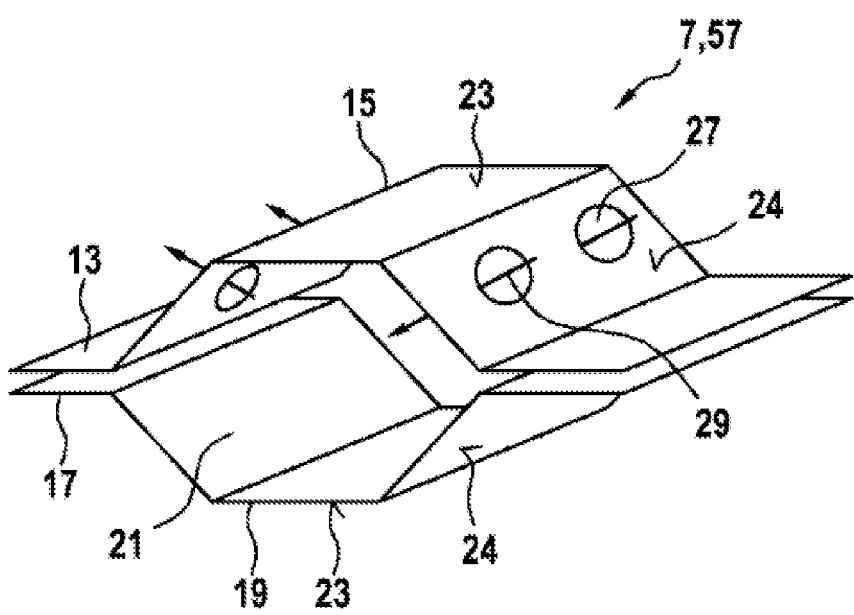
FIG. 3 a perspective view of a bead arrangement according to the prior art.

FIG. 3 shows a perspective view of a section of a bipolar plate 7 with a bead arrangement 57. The bipolar plate 7 comprises a first monopolar plate 13 having a first bead 15 and a second monopolar plate 17 having a second bead 19, each according to the prior art.

The first bead 15 and the second bead 19 are arranged opposite one another and form a channel 21. The first bead 15 and the second bead 19 each comprise a central base surface 23 and two inclined surfaces 24, the inclined surfaces 24 comprising openings 27 through which a medium 29 can be guided.

Figure 4:
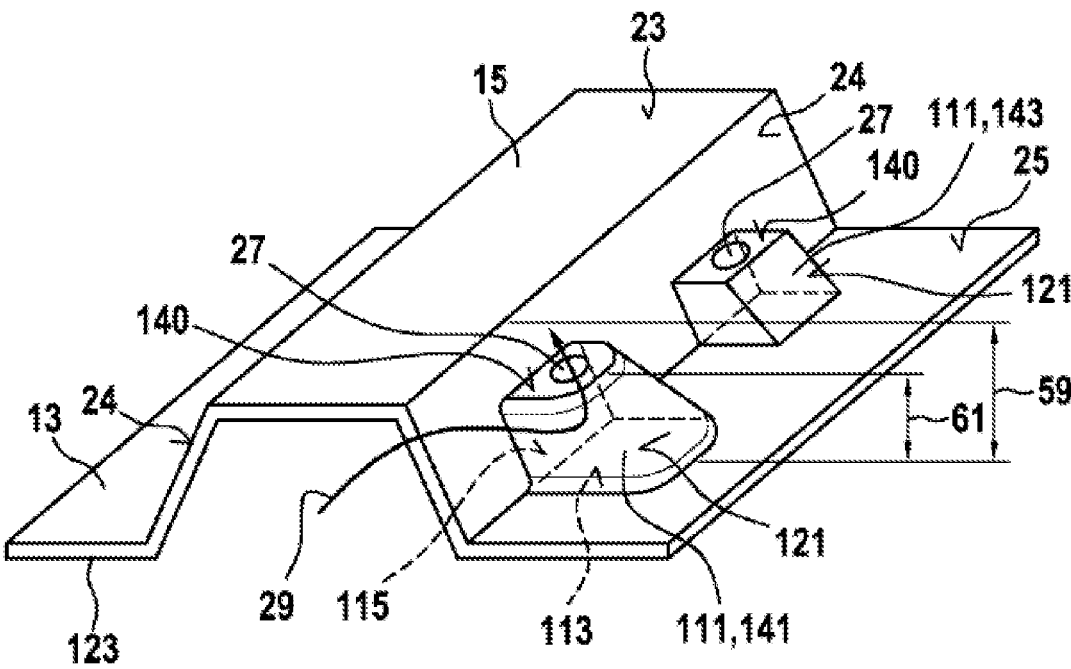
FIG. 4 a perspective view of a first monopolar plate with opening elements.

FIG. 4 shows a perspective view of a section of a first monopolar plate 13 with a first bead 15. The first monopolar plate 13 comprises a central base surface 23, two inclined surfaces 24, and an outer base surface 25. Arranged on the first bead 15, between one of the inclined surfaces 24 and the outer base surface 25, are two opening elements 111 for the passage of the medium 29. The opening elements 111 each comprise a lateral surface 121, a first open side surface 113, a second open side surface 115, and a top surface 140. The top surfaces 140 each comprise an opening 27. Furthermore, the respective first open side surface 113 lies within the outer base surface 25, and the respective second open side surface 115 lies within the inclined surface 24.

The medium 29 enters the opening element 111 through the first open side surface 113 and the second open side surface 115, respectively, and exits said opening element through the opening 27 in the top surface 140.

A first opening element 141 is shown, the top surface 140 being partially circular. In a second opening element 143, the top surface 140 has a rectangular shape.

The central base surface 23 of the first bead 15 is arranged at a first height 59, whereas the top surfaces 140 are arranged at a second height 61, each in relation to a base plate 123 of the first monopolar plate 13.

Figure 5:
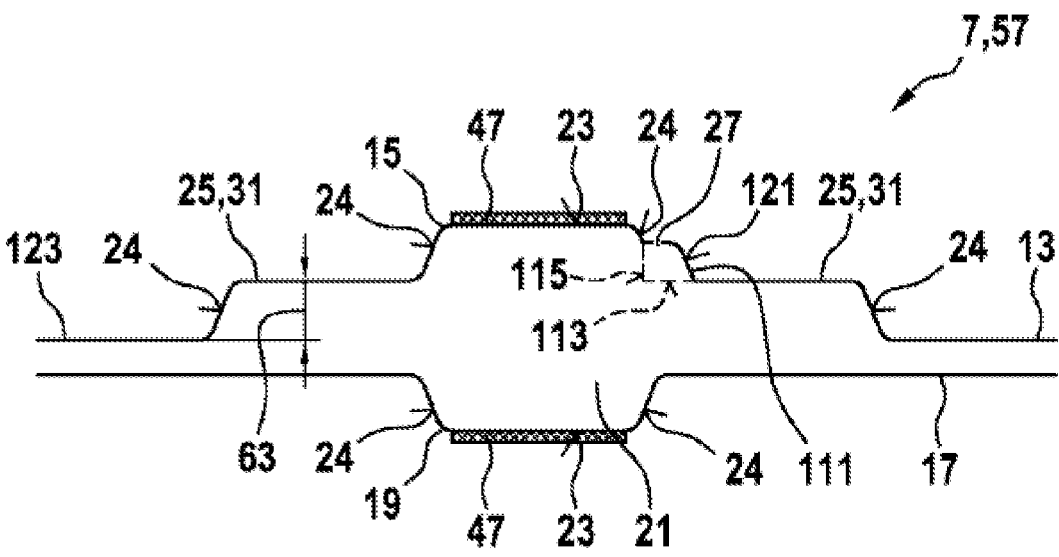
FIG. 5 a cross-sectional view of a bead arrangement with a step.

FIG. 5 shows a cross-sectional view of a further embodiment of a bead arrangement 57 of a bipolar plate 7. The first bead 15 in this case comprises four inclined surfaces 24, in which case an outer base surface 25 is arranged between two of the four inclined surfaces 24 and forms a step 31. Accordingly, the opening element 111 is arranged on the step 31. The step 31 is arranged at a third height 63 with respect to ground plane 123 of first monopolar plate 13. The central base surfaces 23 further comprise a seal 47.

The invention is not limited to the exemplary embodiments described herein and the aspects highlighted thereby. Rather, within the range specified by the claims, a large number of modifications are possible which lie within the abilities of a skilled person.

The invention claimed is:

1. A bipolar plate (7) for an electrochemical cell (1), the bipolar plate comprising at least one first monopolar plate (13) having a first bead (15), and a second monopolar plate (17) having a second bead (19), wherein the first bead (15) and the second bead (19) are arranged opposite one another and form a channel (21), wherein the first bead (15) and the second bead (19) each comprise a central base surface (23) and at least two inclined surfaces (24) and the first bead (15) and/or the second bead (19) comprise at least one outer base surface (25), and wherein at least one opening element (111) for the passage of at least one medium (29) between one of the at least two inclined surfaces (24) and the at least one outer base surface (25) is located on the first bead (15) and/or the second bead (19), said at least one opening element (111) comprising a lateral surface (121), a first open side surface (113), a second open side surface (115), and a top surface (140) having an opening (27), said first open side surface (113) being located in the at least one outer base surface (25), and said second open side surface (115) being located in one of the at least two inclined surfaces (24).

2. The bipolar plate (7) according to claim 1, wherein the top surface (140) is arranged substantially parallel to the at least one outer base surface (25).

3. The bipolar plate (7) according to claim 2, wherein the top surface (140) has a rectangular shape or is at least partially circular in shape.

4. The bipolar plate (7) according to claim 3, wherein the lateral surface (121) is bordered by the top surface (140), the at least one outer base surface (25), and one of the at least two inclined surfaces (24).

5. The bipolar plate (7) according to claim 4, wherein the opening (27) has a circular cross-section.

6. The bipolar plate (7) according to claim 5, wherein the opening (27) forms a third side surface of the opening element (111).

7. The bipolar plate (7) according to claim 6, wherein the first bead (15) and/or the second bead (19) each comprise at least three inclined surfaces (24), wherein the at least one outer base surface (25) is arranged between two of the at least three inclined surfaces (24) and forms a step (31).

8. The bipolar plate (7) according to claim 1, wherein the top surface (140) has a rectangular shape or is at least partially circular in shape.

9. The bipolar plate (7) according to claim 1, wherein the lateral surface (121) is bordered by the top surface (140), the at least one outer base surface (25), and one of the at least two inclined surfaces (24).

10. The bipolar plate (7) according to claim 1, wherein the opening (27) has a circular cross-section.

11. The bipolar plate (7) according to claim 1, wherein the opening (27) forms a third side surface of the opening element (111).

12. The bipolar plate (7) according to claim 1, wherein the first bead (15) and/or the second bead (19) each comprise at least three inclined surfaces (24), wherein the at least one outer base surface (25) is arranged between two of the at least three inclined surfaces (24) and forms a step (31).

13. A method for manufacturing a bipolar plate (7) according to claim 1, wherein the first bead (15) and/or the second bead (19) and the at least one opening element (111) are manufactured by embossing from a base plate (123) of the first monopolar plate (13) and the second monopolar plate (17), respectively.

14. An arrangement (69) of electrochemical cells (1) comprising at least one bipolar plate (7) according to claim 1 and at least one membrane-electrode assembly (4), wherein the at least one opening element (111) is arranged on the at least one bipolar plate (7) such that the opening (27) faces the at least one membrane-electrode assembly (4).

15. A method for operating an arrangement (69) of electrochemical cells (1) according to claim 14, wherein the at least one medium (29) is passed from the channel (21) through the at least one opening element (111) to the at least one membrane-electrode assembly (4), wherein the at least one medium (29) enters the at least one opening element (111) through the second open side surface (115) and/or through the first open side surface (113) and exits the at least one opening element (111) through the opening (27).

* * * * *